United States Patent [19]
Mazziotti

[11] 3,842,621
[45] Oct. 22, 1974

[54] SEALING BOOT AND COVER

[75] Inventor: Philip J. Mazziotti, Toledo, Ohio

[73] Assignee: Dana Corporation, Toledo, Ohio

[22] Filed: June 15, 1973

[21] Appl. No.: 370,259

[52] U.S. Cl. .......................... 64/32 F, 64/8, 64/21, 277/82
[51] Int. Cl. ............................................. F16d 3/84
[58] Field of Search ............ 64/32 F, 32 R, 8, 21, 7; 277/82, 65

[56] References Cited
UNITED STATES PATENTS

| | | | |
|---|---|---|---|
| 1,397,413 | 11/1921 | Evans | 64/32 F |
| 1,607,616 | 11/1926 | Greninger | 64/32 R |
| 2,510,362 | 6/1950 | Anderson | 64/32 F |
| 2,847,837 | 8/1958 | Baker | 64/32 F |
| 2,904,356 | 9/1959 | Love | 64/32 F |
| 3,075,370 | 1/1963 | Kings | 64/32 R |
| 3,362,192 | 1/1968 | Orain | 64/21 |

Primary Examiner—Samuel Scott
Assistant Examiner—Randall Heald
Attorney, Agent, or Firm—Robert E. Pollock

[57] ABSTRACT

A universal joint which forms a driving connection between a front road wheel of a motor vehicle is provided with a sealing boot and a separate shaft mounted cover to protect the boot from stone and gravel inpingement with additional means to prevent abrasive wear of foliage wiping over the boot in "off-road" service. The latter feature is accomplished by providing an annular outer lip on the boot adapted for constant contact with the interior of the cover so that a purging action can take place during rotation of and relative angular movement between the joint members resulting in a wiping action of the lip on the interior surface of the cover, whereby any foreign material entering the cover is subsequently removed therefrom as a result of relative angular movement between the joint members.

7 Claims, 4 Drawing Figures

SEALING BOOT AND COVER

BACKGROUND OF THE INVENTION

1. Field of the Invention

The present invention relates to a sealing arrangement for universal joints of the type used for drivably connecting two shafts of which the axes intersect and the alignment may vary.

2. Description of the Prior Art

Although universal joints utilizing flexible boots in combination with a rigid outer cover exist and are effective to protect the working parts of a universal joint from mud, stone and gravel damage, the known designs are not totally effective in limiting foliage contact, such as long grass, shrubs, and the like, with the boot.

Also, providing a rigid spherically shaped protective cover for sealingly cooperating with a flexible boot of a universal joint in itself is not new as evidenced by U.S. Pat. No. 3,075,370 to Kings. Further, having a flexible boot secured at opposite ends to each joint member with an outer rigid cover mounted on one end of the boot and enclosing a portion of the boot to protect the same is old in view of the Anderson U.S. Pat. No. 2,579,356.

SUMMARY OF THE INVENTION

The present invention proposes providing a combination flexible boot and rigid cover for enclosing and protecting the working parts of a universal joint connecting a pair of shafts wherein one end of the boot is connected to one of the joint members and the opposite end of the boot is secured to one of the shafts. The rigid cover also has one end connected to the shaft but has the opposite end enlarged so as to enclose the boot in spaced relation. Means is integrally formed on the boot for cooperating with the cover whereby an improved design results having the capability of providing additional protection for the boot under all terrain conditions and also providing a design which can be easily modified to suit any number of applications.

These and other advantages of the invention will be more apparent from the following description of the preferred embodiment of the invention taken together with the accompany drawings.

DESCRIPTION OF THE PREFERRED EMBODIMENTS

Figure 1:
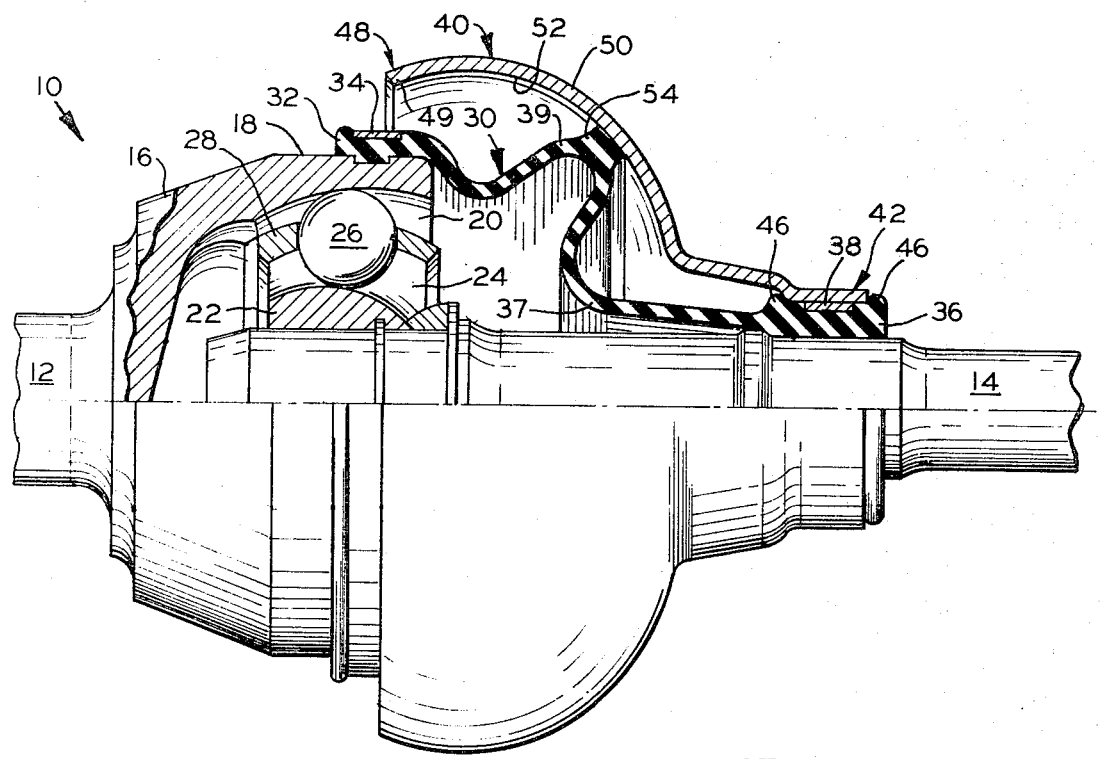
FIG. 1 is a partial cross-section side elevational view of a universal joint incorporating the features of the invention.

Referring now to the drawings, a universal joint is shown generally at 10 for drivingly connecting a pair of shafts 12 and 14, either of which may be the driving or driven member. More particularly, the universal joint 10 includes first and second members with the first member consisting of a housing or outer race 16, integral with the shaft 12, having a cylindrical outer peripheral surface 18 and a plurality of internally spaced grooves 20. The second member consisting of an inner race 22 secured to the inner end of the shaft 14 and having grooves 24 spaced about its periphery corresponding to the grooves 20 of the outer race 16. A drive ball 26 is located within each of the corresponding pairs of grooves 20 and 24 with a cage 28 being positioned between the outer race 16 and inner race 22 to maintain all the drive balls 26 in a plane which bisects the angle formed by the axes of the shafts 12 and 14 to insure operation as a constant velocity joint.

While one type of universal joint has been shown for the purpose of illustration, it is to be understood that other types may be used. Also, the joint structure is equally applicable to universal joints in other locations in the power train of motor vehicles.

SEALING ARRANGEMENT

The sealing arrangement of the present invention includes a flexible boot 30 and a hollow rigid protective shield or cover 40. The boot 30 is provided to enclose the working parts of the universal joint 10 and protect it from damage, dirt, and loss of lubricant from the joint interior. One end of the boot 30 has an enlarged annular open end portion 32 which is received over and secured about the surface 18 of the outer race 16 by a clamp ring 34. The opposite end of the boot 30 has a smaller annular open end portion 36 encircling and secured to the axially extending portion of shaft 14 by a clamp ring 38. The ends 32 and 36 of the boot are connected by a flexible wall portion 37 which is interrupted by an angularly outwardly extending loop portion 39.

The cover 40 consists of a substantially hollow rigid member serving as an enclosure which will adequately protect the boot 30 from stone, gravel and foliage impingement. The cover 40 is generally bell-shaped having a reduced diameter open end portion 42 designed to encircle the clamp ring 38 and be frictionally held at this end of the boot 30 between a pair of axially spaced raised annular shoulders 46—46. Thus, means is provided for supporting this end of the cover 40 with respect to the end portion 36 of the boot 30. The opposite end or mouth of the cover 40 includes an enlarged open end portion 48 having a slightly inwardly extending curved portion 49 at its extremity which terminates at but is spaced radially outwardly of the clamp ring 34 at the position of axial alignment of the shafts 12 and 14. Intermediate the ends 42 and 48, the cover 40 is constructed, as viewed in cross section, with arcuate wall portion 50 which provides an arcuately shaped internal surface 52 for cooperating with the boot 30 in a manner to be described in detail hereinafter.

Figure 2:
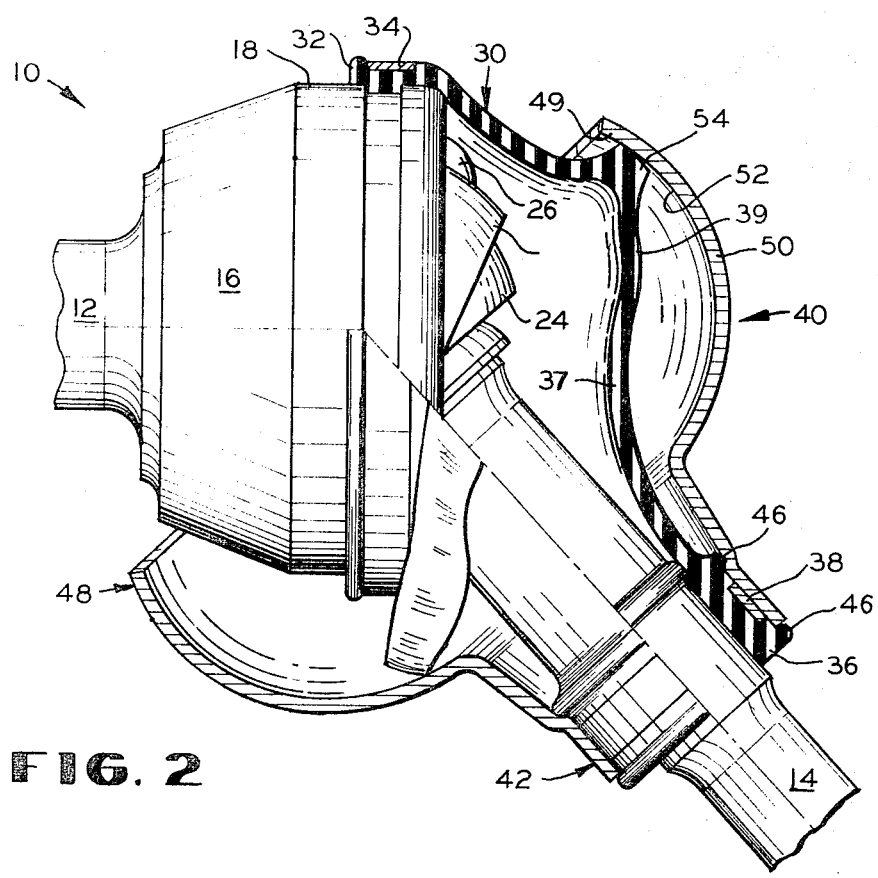
FIG. 2 is a view similar to FIG. 1 with the shafts angularly displaced to show the relationship of the boot and cover as a result of such movement.

More particularly, the boot 30 fits within the cover 40, and as seen in cross section, the boot has an annular raised sealing lip 54 integrally formed on the outer periphery of the angularly disposed loop portion 39 which connects the ends 32 and 36 of the boot. The loop portion 39 forms a bellow type structure on the boot and by engagement of the lip 54 with the inner surface 52 of the cover, a structure is provided whereby wiping of foreign material from the interior of the cover will be possible as described later in greater detail. The loop portion 39 will absorb the deflection in the joint without the lip 54 ever leaving the surface 52 even under the most extreme angular relationship of the shafts 12 and 14 as seen in FIG. 2. A resilient feature is built into the loop portion 39 since in its free state, it is substantially greater in diameter than the interior surface 52, so that when assembled the loop portion 39 assumes a somewhat compressed condition resulting in a resilient loading which reacts to constantly urge the lip 54 into engagement with the surface 52.

Figure 3:
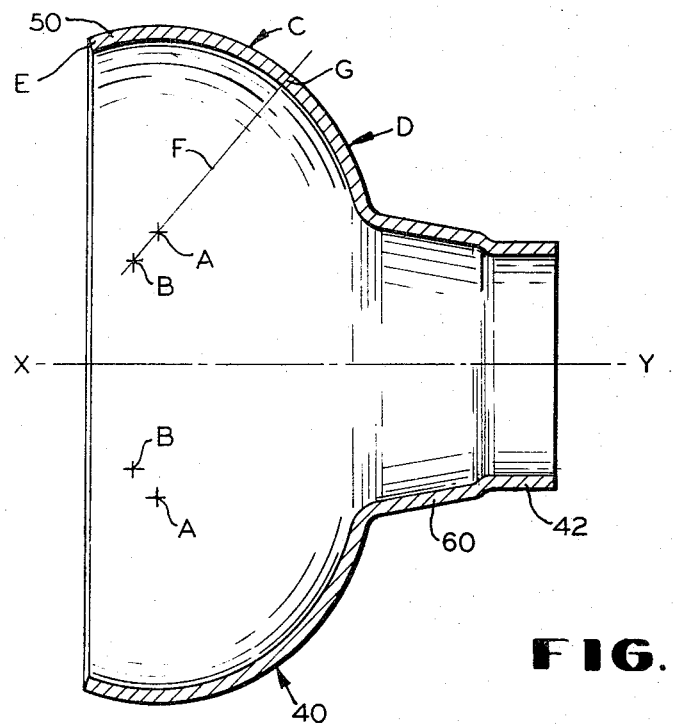
FIG. 3 is a sectional view of the cover to more clearly define the details of construction.

In the preferred embodiment, and referring particularly to FIG. 3, the configuration of the cover member 40 has been satisfactorily constructed by developing the arcuate wall portion 50 from two distinct points A and B so that the wall actually consists of two arcuate segments C and D, when viewed in longitudinal cross section, which blend to form the smooth interior surface 52 for cooperating with the outer sealing surface of lip 54.

It will further be evident from the cross sectional view of the cover member 50 that the leftward or outer end of arcuate segment C is designed to run-out or terminate in an inwardly directed lip portion E which is curved so as to extend toward the central axis X-Y thereby providing a structure which further aids in preventing entrance of foreign matter into the boot area while still permitting the desired angular movement between the joint members.

More specifically, the points A and B are shown lying within the cover member 40 and disposed radially outwardly of the central axis X-Y so as to be positioned in an angularly spaced relationship at a predetermined distance away from one another. The wall portion C, located at the open end to the left, is generated from the point A while point B, from which the remaining wall portion D is generated is disposed to the left of point A and radially inwardly toward the central axis X-Y.

A line F drawn through points A and B and extending beyond the wall portion 50 will show a cutting plate G through the wall at which point the two arcuate segments C and D merge. Further, the arcuate segment D, opposite point G, is shown merging into an angularly inwardly and axially extending annular portion 60 which then blends with the reduced diameter open end portion 42 to complete the structure of the cover member 40.

From the above description, it can be seen that the rigid cover member 40, when viewed in longitudinal cross section, is bell-shaped, as indicated before, and includes three distinct portions merging together to form an integral construction capable of providing the desired results of the present invention. The portions consist of the outer mouth of the bell which is made up of the annular arcuate inwardly extending wall portion 50, the intermediate annular angular and axially extending portion 60 and the inner reduced diameter open end portion 42 which comprises the annular axially extending mounting portion located between the raised shoulders 46–46 on the boot end 36.

Referring in greater detail to the configuration of the lip 54 on the boot 30 and the interior surface 52 on the cover 40, it will be seen that the geometry of the part is such that constant contact between the lip 54 and surface 52 will be maintained under all operating conditions of the unverisal joint and that, as seen in FIG. 2, even under great angular deflection.

Further, the sealing lip 54 on the periphery of the loop portion 39 constantly seals against the inside surface 52 of the cover 40 since the cover configuration is developed to maintain land contact as the boot is flexed and rotated. The lip 54 is designed to divorce the portion of the interior of the cover 40 to the right of the lip 54, as seen in the drawings, from the environment enabling the portion of the interior to the left of the lip 54 to be purged of foreign material by the wiping action of the lip 54 on the surface 52 resulting from boot motion within the cover 40. This wiping action of the lip 54 within the cover is effective to dislodge and discharge any contaminants from the interior of the cover that may have entered as a result of a vehicle traversing "off-road" terrain. This action will take place regardless of whether the cover is rotating with the shaft or held stationary with respect to the shaft.

Figure 4:
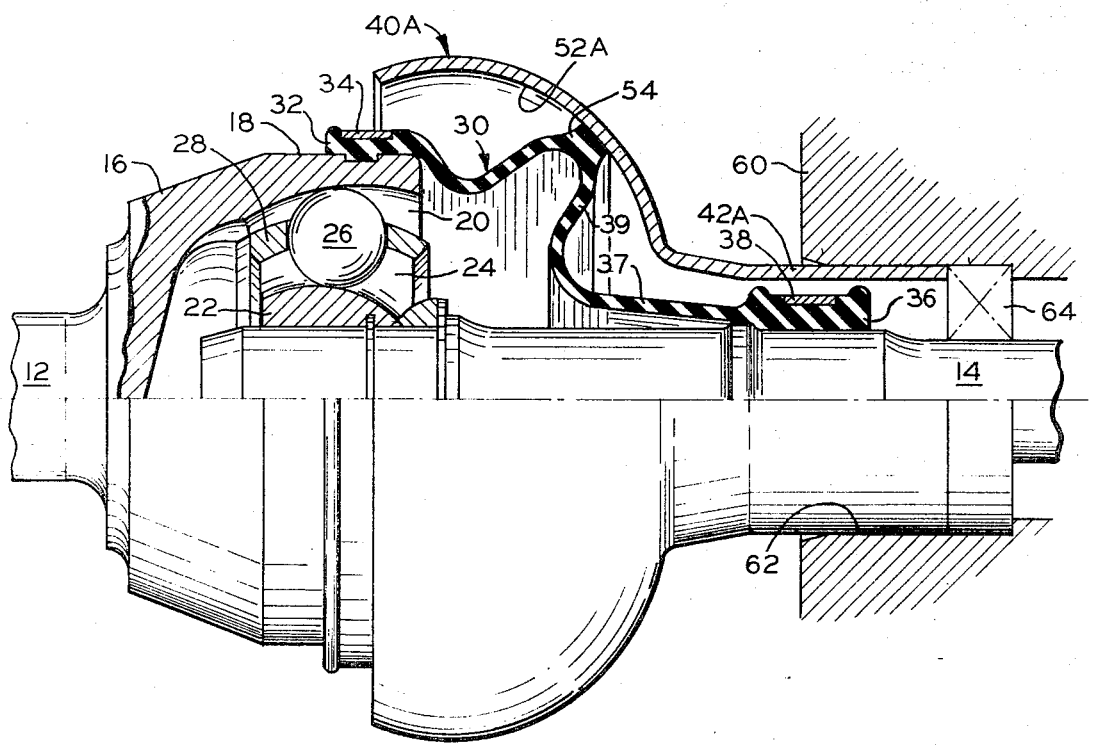
FIG. 4 is a view similar to FIG. 1 showing an alternate embodiment incorporating the features of the invention.

An alternate embodiment is shown in FIG. 4 wherein means is provided to support a cover 40A in a stationary housing 60 so that the cover is independent of the universal joint 10 and shaft 14 and functions as a non-rotating element while still cooperating with a boot 30 identical in all respects to that shown and described in the previous embodiment. The non-rotating feature is accomplished by a tubular axially elongated reduced diameter end portion 42A of the cover 40A which is designed to encircle the end portion 36 of the boot 30 in spaced relationship and adapted to be frictionally received within an opening 62 formed in the stationary housing 60. Thus, in this application, the cover 40 is non-rotatably supported in the stationary housing 60 while the boot 30 is mounted as previously described so as to be rotatable relative thereto. A sealed bearing 64 is also pressed within the openings 62 and cooperates with the innermost end of the portion 42A and surrounds and engages the outer diameter of the shaft 14 to provide a suitable sealing arrangement therebetween.

The wiping action of the lip 54 of the boot 30 on the interior surface 52A of the cover 40A is similar in all respects to that described in connection with the emmbodiment disclosed in FIGS. 1 and 2 and accordingly requires no further discussion.

Through the utilization of the separate boot and cover design as described, it will be apparent that the parts can be altered individually to suit specific application requirements. Also, the boot can be fixed to the shaft as described so as to rotate with the shaft or it can be mounted so that the boot can be held stationary if such a design is advantageous. The cover can be made as a metal spinning or molded from plastic or hard elastomer.

From the foregoing, it can be seen that an improved sealing arrangement has been shown and described consisting of a rigid cover which encloses and is mounted on the shaft end of a flexible boot to protect the same from impingement damage wherein the cover has a developed profile for interior surface contact with one or more outer wiping lips integral with the boot. The outer wiping lip additionally provides sealing of a portion of the cavity between the cover and boot from foreign matter. Further, this combination provides a structure capable of purging foreign material from the cover interior.

Since numerous changes from the embodiment disclosed may be made within the spirit and scope of the inventive concepts taught herein, it is intended that the invention not be limited to the specific embodiment shown and described but that the invention be given a scope consistent with the language of the following claims.

What is claimed is:

1. An improved sealing arrangement for a universal joint including:
   a first member,
   a second member having a shaft extending therefrom,
   drive means connecting the first and second member to transmit torque therebetween,
the improvement comprising:
   a. a flexible boot including an angularly disposed loop resiliently urged outwardly and an integral annular external lip extending outwardly therefrom said boot having one end connected to the first member and the opposite end connected to said shaft,
   b. a hollow rigid cover surrounding at least a portion of the periphery of said boot and having first and second ends and an internal sealing surface in said first end,
   c. said first end of said cover being spaced from said one end of said boot,
   d. said external lip on said boot being in constant engagement with said internal sealing surface in said cover, and
   e. means supporting the second end of said cover for maintaining the same co-axial with the axially stationary relative to the shaft.

2. An improved sealing arrangement for a universal joint according to claim 1 wherein said means supporting said one end of said cover includes an annular support portion on said cover connected to the opposite end of said boot.

3. An improved sealing arrangement for a universal joint according to claim 1 wherein said means for supporting said one end of said cover includes a stationary housing and an annular support portion on said cover connected to the stationary housing.

4. An improved sealing arrangement for a universal joint according to claim 1 wherein said internal sealing surface is an angularly disposed arcuate wall.

5. An improved sealing arrangement for a universal joint according to claim 4 wherein said angularly disposed arcuate wall includes at least two segments defining a smooth interior sealing surface for cooperating with said angularly disposed loop.

6. A sealing arrangement for a universal joint according to claim 5 wherein one of the segments includes an inwardly extending portion for providing additional protection for said flexible boot.

7. A sealing arrangement for a universal joint according to claim 1 wherein said hollow rigid cover is bell-shaped and when viewed in longitudinal cross-section comprises an outer annular arcuate wall portion, an intermediate annular wall portion merging with the arcuate wall portion and extending angularly inwardly therefrom and an inner axially directed annular mounting portion merging with the intermediate wall portion.

* * * * *